United States Patent
Cooper et al.

(10) Patent No.: US 8,975,779 B2
(45) Date of Patent: Mar. 10, 2015

(54) LOAD MANAGEMENT CONTROLLER

(76) Inventors: Timothy Patrick Cooper, Dun Laoghaire (IE); Colin David Harris, Rathfarnham (IE); Thomas Laurence Bean, Dun Laoghaire (IE)

( * ) Notice: Subject to any disclaimer, the term of this patent is extended or adjusted under 35 U.S.C. 154(b) by 932 days.

(21) Appl. No.: 12/596,078

(22) PCT Filed: Apr. 17, 2008

(86) PCT No.: PCT/EP2008/054695
§ 371 (c)(1),
(2), (4) Date: Apr. 19, 2010

(87) PCT Pub. No.: WO2008/125696
PCT Pub. Date: Oct. 23, 2008

(65) Prior Publication Data
US 2010/0207448 A1    Aug. 19, 2010

(30) Foreign Application Priority Data

Apr. 17, 2007 (IE) .................... S2007/0278
Aug. 3, 2007 (IE) .................... S2007/0557
Feb. 14, 2008 (IE) .................... S2008/0111

(51) Int. Cl.
*H02J 3/06* (2006.01)
*H02J 3/38* (2006.01)
*H02J 3/14* (2006.01)
*H02J 3/32* (2006.01)

(52) U.S. Cl.
CPC ... *H02J 3/14* (2013.01); *H02J 3/32* (2013.01); *H02J 3/383* (2013.01); *H02J 3/386* (2013.01); *H02J 2003/143* (2013.01); *Y02B 70/3225* (2013.01); *Y02B 70/3266* (2013.01); *Y02E 70/30* (2013.01); *Y04S 20/222* (2013.01); *Y04S 20/242* (2013.01); *Y02E 10/563* (2013.01); *Y02E 10/566* (2013.01); *Y02E 10/763* (2013.01); *H02J 3/382* (2013.01); *Y02B 10/14* (2013.01)
USPC ............................................. 307/43; 307/20

(58) Field of Classification Search
USPC ...................................................... 307/43, 20
See application file for complete search history.

(56) References Cited

U.S. PATENT DOCUMENTS

| | | | |
|---|---|---|---|
| 3,955,061 A * | 5/1976 | Roehrman | 219/662 |
| 2003/0047209 A1 | 3/2003 | Yanai | |
| 2006/0158037 A1 | 7/2006 | Danley | |
| 2006/0276938 A1 | 12/2006 | Miller | |
| 2008/0096404 A1 * | 4/2008 | Caggiano | 439/108 |

OTHER PUBLICATIONS

International Search Report with Written Opinion, dated Oct. 15, 2008, received in international patent application No. PCT/EP2008/054695, 3 pgs.

* cited by examiner

*Primary Examiner* — Rexford Barnie
*Assistant Examiner* — Dru Parries
(74) *Attorney, Agent, or Firm* — Holland & Knight LLP; Brian J. Colandreo, Esq.; Jeffrey T. Placker, Esq.

(57) ABSTRACT

The present invention relates to a load management controller for a household electrical installation comprising a pair of electricity supplies, a grid supply and a micro-generator supply, providing electricity to a plurality if sub-circuits. The household electrical installation has means to monitor the amount of electricity being supplied by the micro-generator supply and the amount of electricity being consumed in the household. The load management controller has means to access and use that information to control the supply of electricity to an energy storage sub-circuit to route surplus electricity supplied by the micro-generator to the energy storage sub-circuit. Furthermore, the load management controller can communicate with a remote electricity supplier to control the loads in the household to achieve better grid management and efficiency.

15 Claims, 4 Drawing Sheets

LOAD MANAGEMENT CONTROLLER

RELATED APPLICATIONS

The subject application is a U.S. National Stage application that claims the priority of International Application No. PCT/EP2008/054695, filed on 17 Apr. 2008, which claims the priority of Irish National Application Nos.: S2007/0278, filed on 17 Apr. 2007; S2007/0557, filed on 03 Aug. 2007 and S2008/0111, filed on 14 Feb. 2008, the contents of which are herein incorporated by reference in their entirety.

INTRODUCTION

This specification relates to a load management controller for a household electrical installation.

Heretofore, the vast majority of households have been provided with their electricity supply from a third party electricity provider. General speaking, the electricity provider generates the electricity in large electricity generating stations and thereafter supplies that electricity over an electricity supply grid to their customers. There are numerous problems with this system and method of supplying electricity. First of all, typically, the consumer has a limited choice of electricity provider and in many cases the consumer will have only one electricity provider willing to provide them with their electricity needs. This leads to monopolies or effective monopolies for the electricity providers resulting in high electricity supply costs to the consumer. Secondly, many of the electricity generating stations operate using relatively environmentally unfriendly electricity generation methods and the more electricity used by the consumer, the more harmful to the environment they will be. This is a particular dilemma to those consumers that are environmentally aware.

One solution that has been proposed is for individual households to create their own electricity supply using a micro-generator. In this specification, the term micro-generator will be understood to mean a solar photovoltaic (PV) array, a wind turbine, a water turbine, a small combined heat and power unit (CHP) or other small scale micro-generator that can be used to generate electricity in the household. Although this is often seen as a more cost effective and environmentally friendly solution in the long term, there are also problems with using micro-generators as a sole electricity supply source. The greatest problem being that the micro-generators that operate using renewable energy supplies, such as PV arrays, are not guaranteed to supply sufficient amounts of energy to a household at all times and therefore the micro-generators are typically used in conjunction with rather than replacing the grid electricity supply.

Furthermore, surplus electricity from a micro-generator that is not being used in the household will flow back through the household meter on to the grid unless steps are taken to prevent this from happening. This is often undesirable because electricity that flows back to the grid is subject to distribution and transmission losses. These losses do not occur if all of the electricity generated by the micro-generator is consumed in the household. It is also uneconomical if the tariff paid for electricity exported onto the grid is less than the tariff paid for electricity imported from the grid.

Another problem with the known systems, particularly from an environmental point of view, is that the electricity generating stations are relatively inefficient in their operation. Generally speaking, the electricity generating stations are designed to handle a given maximum load on the grid, however, the actual load experienced by the electricity generating stations is usually only a fraction of the maximum load. Typically, electricity generating stations operate at approximately 60% of their maximum load. As a consequence, system losses and capital and maintenance costs, which are related to the size of the plant, represent a very much greater proportion of the delivered power and value than is the case when the plant is operating at full load.

Many believe that the current practices result in low generation and transmission/distribution plant utilisation, low economic return and low operating efficiency. The consequences of these include high fuel consumption, high cost of electricity and high associated emissions. In addition to this, there is increasing concern about the effect on climate caused by emissions resulting from the burning of fossil fuels in electricity generating stations. Also, the cost of fossil fuel is expected to continue increasing rapidly because fossil fuel production rates have peaked. The cost of electricity is expected to increase correspondingly. It is now recognised that a coherent energy storage and use strategy is required to counter these negative economic and environmental effects. Coherent storage and use of electricity in the household is a critically important element of this strategy. Heretofore, very few households have implemented a coherent strategy of this nature.

It is known for electricity providers and grid operators to provide incentives to consumers to use electricity at times other than the traditional peak times in order to spread the demand for the electricity more evenly over a 24 hour period. Heretofore, these incentives have been directed mainly towards commercial and industrial consumers where capacity, demand and time based tariffs are available and where discounts are given for supplies that can be interrupted by the providers in certain circumstances, for example during periods of exceptionally high demand or plant outages. The incentives applying to households have, by and large, consisted of day/night type dual tariffs aimed at encouraging households to reduce electricity consumption during the day and to increase electricity consumption during the night.

In recent years, thought has been given to the use of more complex time based import and export tariffs intended to encourage household customers to reduce or increase electricity consumption during certain periods, and where local storage of electricity is possible in storage devices such as battery banks, electric vehicles with rechargeable battery packs, capacitors and the like, to charge or discharge the storage devices during certain periods. Where electricity storage devices are connected directly to the main household circuit or the grid by means of approved inverter type devices, the discharged electricity can, in certain circumstances, be used to provide power that is exported from the household to the National grid.

The approach adopted in this regard by Network operators has been to provide/install a new type of household meter, commonly know as a smart meter, that will be used to log, record and transmit time based import and export data for each smart metered household to a central server and to pass on this data to providers and purchasers of electricity so that they can charge and pay the household customers accordingly. This provides a sound financial basis for rewarding households that import and export electricity in a way that helps the electricity providers and grid operators to optimise the operation of their plant but does not provide a method for optimising the import and export of electricity accordingly.

It is desirable to provide such a method and device in the form of a load management controller that optimises the import and export of electricity in a household in a way that helps electricity providers and grid operators to optimise the operation of their plant and enables the householder to avail of related incentives, such as variable time-based import and export tariffs, where they exist. It is also desirable to provide a load management controller that uses the same control technology to minimise electricity consumption in a household by switching non-essential devices off when they are not required.

It is an object therefore of the present invention to provide a load management controller for a household electrical installation that overcomes at least some of the difficulties with the known systems and methods incorporating micro-generators. It is a further object of the present invention to provide a load management controller that causes the electricity generated from a micro-generator to be utilised in an efficient and effective manner.

STATEMENTS OF INVENTION

According to the invention there is provided a load management controller for a household electrical installation, the household electrical installation comprising a main panel receiving electricity from a pair of electricity supplies and distributing the electricity to a plurality of electrical sub-circuits, one of which being an energy storage sub-circuit, the pair of electricity supplies comprising a grid supply and a micro-generator supply, the household electrical installation further comprising:
a power meter to monitor the amount of electricity being supplied by the micro-generator;
a power meter to monitor the amount of electricity being consumed in the household; and
the load management controller comprising means to alter the amount of electricity supplied to the energy storage sub-circuit to route surplus electricity supplied by the micro-generator to the energy storage sub-circuit.

By having such a load management controller, it is possible to ensure that all of the electricity generated by the micro-generator is put to use in the household if desired. The electricity is stored in an energy storage sub-circuit for subsequent use. If the household requires more or less electricity, the supply of electricity to the energy storage sub-circuit may be reduced or increased accordingly.

In one embodiment of the invention there is provided a load management controller in which the means to alter the amount of electricity supplied by the micro-generator to the energy storage sub-circuit further comprises a thyristor.

In another embodiment of the invention there is provided a load management controller in which the energy storage sub-circuit comprises an energy storage device.

In a further embodiment of the invention there is provided a load management controller in which the energy storage device comprises one or more of an electrical immersion, a storage heating unit, a static rechargeable battery bank, a rechargeable battery pack of a motorised vehicle and an electrical under floor heating unit.

In one embodiment of the invention there is provided a load management controller in which each of the electrical sub-circuits has an electricity usage profile containing rules determining the supply of electricity to the electricity sub-circuit associated therewith, the load management controller comprising means to access the electricity usage profiles and means to control supply of electricity to the electrical sub-circuits having an electricity usage profile in accordance with the rules of the electricity usage profile for that electrical sub-circuit.

By having such a load management controller, it will be possible to control the delivery of electricity to the electrical sub-circuits to ensure that electricity is not being wasted needlessly and that the household operates in an electrically efficient manner. Furthermore, this will allow for the load in the household to be optimised to facilitate operation of the grid.

In another embodiment of the invention there is provided a load management controller in which the load management controller has accessible memory and the usage profiles are stored in load management controller accessible memory.

In a further embodiment of the invention there is provided a load management controller in which the accessible memory is programmable and the load management controller has a user interface to allow programming of the electricity usage profiles in accessible memory. In one embodiment of the invention there is provided a load management controller in which the user interface comprises one or more of a data communication port and a keypad.

In another embodiment of the invention there is provided a load management controller in which the means to control supply of electricity to the electrical sub-circuits further comprises a controllable switch, responsive to the load management controller, intermediate the electricity power supply and the electrical sub-circuit having an electricity usage profile. Alternatively, the means to control supply of electricity to the electrical sub-circuits further comprises a thyristor, responsive to the load management controller, intermediate the electricity power supply and the electrical sub-circuit having an electricity usage profile. In a further alternative, the means to control supply of electricity to the electrical sub-circuits further comprises a speed controller, responsive to the load management controller, intermediate the electricity power supply and the electrical sub-circuit having an electricity usage profile.

In another embodiment of the invention there is provided a load management controller in which the load management controller comprises a receiver to receive data from a remote electricity power supply operator.

In a further embodiment of the invention there is provided a load management controller in which the load management controller comprises a transmitter to transmit data to a remote electricity power supply operator.

In one embodiment of the invention there is provided a load management controller in which the load management controller has means to export electricity from a rechargeable battery bank onto an electricity supply grid.

In another embodiment of the invention there is provided a load management controller in which the load management controller has means to export electricity from the micro generator onto an electricity supply grid.

In a further embodiment of the invention there is provided a load management controller in which the load management controller exports the electricity to the electricity supply grid in response to a request for electricity received from a remote electricity power supply operator.

By having such a load management controller, the load on the grid may be more effectively managed as the loads may be reduced in the household and furthermore any additional electricity not needed by the household may be supplied back onto the grid in response to a request from an electricity power supply operator. This will enable the electricity power supply operator to manage their electricity generation and transmission plant more effectively and efficiently than was heretofore the case.

In one embodiment of the invention there is provided a load management controller in which the load management controller further comprises a meter to measure the amount of electricity exported onto the electricity supply grid.

In another embodiment of the invention there is provided a load management controller in which the rules of the electricity usage profile for the electrical sub-circuits are one or more of time-of-day rules, activity related rules, proximity related rules, cost of electricity supply rules and operator determined rules. In a further embodiment of the invention there is provided a load management controller in which the rules of the electricity usage profile for the electrical sub-circuits further comprise occupancy rules.

In one embodiment of the invention there is provided a load management controller in which one of the electricity sub-circuits comprises a rechargeable static battery bank operable as an alternative power supply to the remaining electrical sub-circuits in the household electrical installation.

In another embodiment of the invention there is provided a load management controller comprising means to select one of the rechargeable static battery bank and a grid power supply to provide power to one or more of the remaining electrical sub-circuits.

In a further embodiment of the invention there is provided a load management controller in which one of the electricity sub-circuits comprises a rechargeable battery bank in an electric vehicle operable as an alternative power supply to the remaining electrical sub-circuits in the household electrical installation.

In one embodiment of the invention there is provided a load management controller in which the micro-generator supply comprises a solar PV array. Alternatively, the micro-generator supply further comprises one of a wind turbine, a water turbine and a small CHP.

In a further embodiment of the invention there is provided a load management controller in which the micro-generator supply further comprises a dedicated inverter/controller circuit.

In one embodiment of the invention there is provided a household electrical installation comprising a main panel receiving electricity from a pair of electricity supplies and distributing the electricity to a plurality of electrical sub-circuits, one of which being an energy storage sub-circuit, the pair of electricity supplies comprising a grid supply and a micro-generator supply, the household electrical installation further comprising a load management controller, the household electrical installation comprising:
- a power meter to monitor the amount of electricity being supplied by the micro-generator;
- a power meter to monitor the amount of electricity being consumed in the household; and
- the load management controller comprising means to alter the amount of electricity supplied to the energy storage sub-circuit to route surplus electricity supplied by the micro-generator to the energy storage sub-circuit.

In another embodiment of the invention there is provided a household electrical installation in which each of the electrical sub-circuits has an electricity usage profile containing rules determining the supply of electricity to the electrical sub-circuit associated therewith, the load management controller having access to each of the electricity usage profiles, the load management controller having means to control the supply of electricity to the electricity sub-circuits in accordance with the rules of the electricity usage profile of the electrical sub-circuits.

In a further embodiment of the invention there is provided a household electrical installation in which the means to control the supply of electricity further comprises one of a controllable switch, a thyristor and a controllable motor.

In one embodiment of the invention there is provided a household electrical installation in which one of the electricity sub-circuits comprises a rechargeable static battery bank operable as an alternative power supply to the remaining electrical sub-circuits in the household electrical installation.

In another embodiment of the invention there is provided a household electrical installation in which one of the electricity sub-circuits comprises a rechargeable battery bank in an electric vehicle operable as an alternative power supply to the remaining electrical sub-circuits in the household electrical installation.

In a further embodiment of the invention there is provided a household electrical installation in which the load management controller comprises means to select one of a rechargeable static battery bank, a rechargeable battery bank in an electric vehicle, a micro-generator supply and a grid power supply to provide power to one or more of the remaining electrical sub-circuits.

In one embodiment of the invention there is provided a household electrical installation in which the load management controller has means to communicate with a remote electricity power supply operator.

In another embodiment of the invention there is provided a household electrical installation in which the household electrical installation has means to export electricity from one of a rechargeable battery bank and a micro-generator onto an electricity supply grid.

DETAILED DESCRIPTION OF THE INVENTION

The invention will now be more clearly understood from the following description of some embodiments thereof, given by way of example only, in which:—

Figure 1:
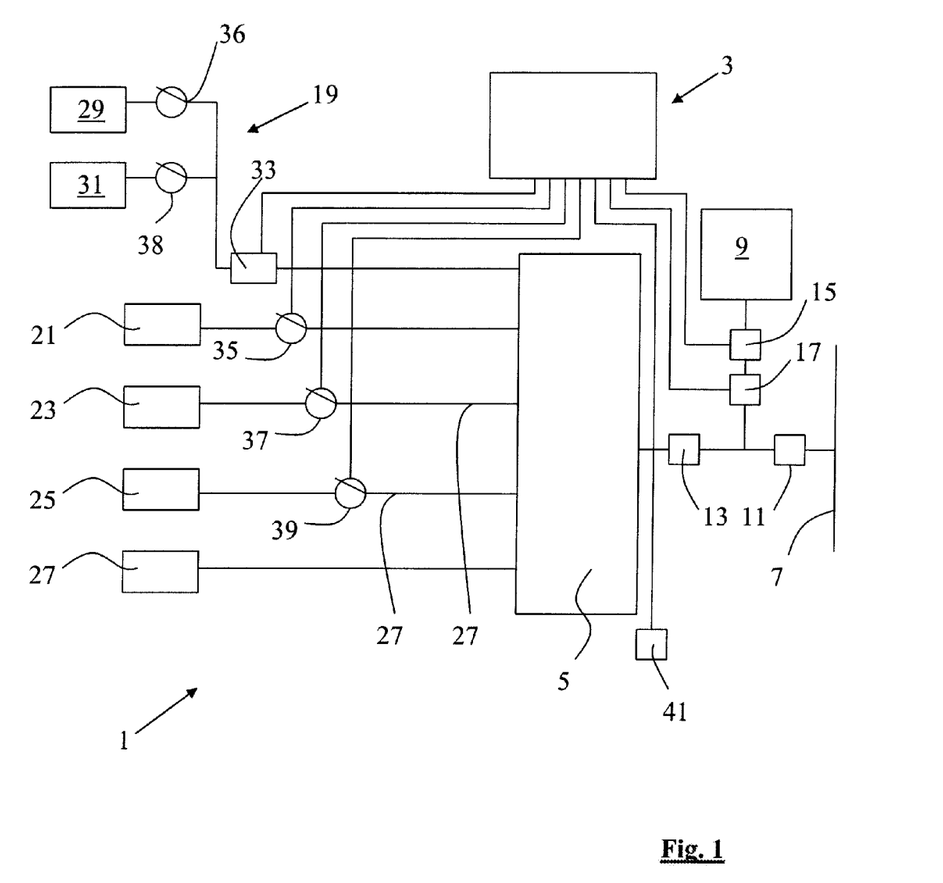
FIG. 1 is a diagrammatic representation of a household electrical installation incorporating the load management controller according to the present invention.

Referring to FIG. 1, there is shown a household electrical installation, indicated generally by the reference numeral 1, incorporating a load management controller 3. The household electrical installation 1 comprises a main panel 5 fed by a pair of electrical supplies, one of which is the grid supply 7 and the other of which is a micro-generator supply 9. The grid supply 7 is fed to the main panel 5 via an electric meter 11 and a load meter 13. The micro-generator supply 9, in this case a 3 kW PV array, further comprises an inverter/controller 15 and is fed to the main panel 5 via a micro-generator meter 17 and the load meter 13.

The household electrical installation 1 further comprises a plurality of electrical sub-circuits 19, 21, 23, 25 and 27 fed from the main panel 5, one of which is an energy storage sub-circuit 19. The electrical sub-circuits include an occupancy related circuit 21 which is in turn connected to equipment such as personal computers, lighting systems, ventilation systems (not shown) and the like, a night saver-on circuit 23 which in turn is connected to equipment such as a washing machine (not shown) and the like, a night-off circuit 25 which in turn is connected to equipment such as controls, pumps, chargers, lights (not shown) and the like, and an essential services circuit 27 which is connected to equipment such as alarms, fridges, security lights (not shown) and the like. The energy storage sub-circuit 19 comprises an electrical immersion 29 and an electric under floor/storage heating unit 31. The energy storage sub-circuit 19 is fed from the main panel via a thyristor 33. The load management controller 3 is in communication with the thyristor 33. There are further provided a plurality of switches 35, 36, 37, 38 and 39 intermediate the main panel and the sub-circuits 21, 29, 23, 31 and 25 respectively. The load management controller is in communication with each of the switches 35, 36, 37, 38 and 39. Finally, an occupancy sensor, 41, in this case provided by an occupancy card switch, is provided and is in communication with the load management controller 3.

In use, the micro-generator supply 9 produces electricity by converting the renewable energy source, in this case sunlight, into electricity. The manner in which the micro-generator supply 9 converts the renewable energy source to electricity will be understood by those suitably skilled in the art and is considered outside the scope of the present invention as the manner of the conversion is not deemed particularly relevant to the understanding of the present invention. Once converted into electricity, the electricity is fed to the main panel from the micro-generator supply 9 via the inverter/controller 15 where the electricity is transformed into a form usable in the household, in this case 50 Hz, 240V AC. The amount of electricity generated and supplied to the main panel by the micro-generator is monitored by power meter 17. This electricity is used to power the sub-circuits 21, 23, 25 and 27 and if there is sufficient electricity remaining, energy storage circuit 19. If the electrical sub-circuits 21, 23, 25, 27 require more electricity, the amount of electricity fed to energy storage sub-circuit 19 is reduced and if the electricity requirements of the electrical sub-circuits 21, 23, 25 and 27 should increase so that they require more electricity than the micro-generator is producing, additional electricity is drawn from the grid supply 7 to meet that need.

If the electricity required by the electrical sub-circuits 21, 23, 25 and 27 should fall below the level of electricity being produced by the load management controller once again, the electricity from the grid 7 is no longer drawn by the main panel and any additional electricity not required by electrical sub-circuits 21, 23, 25 and 27 is once again fed to the energy storage sub-circuit 19. The load management controller 3, with the assistance of the thyristor 33, ensures that the electricity is delivered to the energy storage devices, namely the electrical immersion 29 and the electric under floor/storage heating unit 31 of the energy storage sub-circuit 19, in a very smooth fashion so that sudden increases or decreases in the amount of electricity are not experienced by the energy storage sub-circuit. By providing the electricity in a smooth fashion, the device ensures that the power directed to the energy storage circuit is continuously and smoothly adjusted to match the surplus output from the micro-generator which is constantly changing because solar and wind input, for example, and household consumption are constantly changing.

In addition to the above, the load management controller 3 is in communication with an occupancy sensor 41 and switch 35 intermediate the main panel and the electrical sub-circuit 21. In the event of the occupancy sensor 41 detecting that there are no occupants, the load management controller opens the switch 35 thereby preventing electricity being supplied to the occupancy related electrical sub-circuit 21. This reduces waste of electricity and more electricity from the micro-generator may be directed to the energy storage sub-circuit 19 if available. If the occupancy sensor should detect the presence of occupants, the switch 35 will be closed by the load management controller 3 once more. Similarly, the load management controller 3 will be in communication with the switches 37 and 39 and will be able to control the flow of electricity to the night saver-on electrical sub-circuit 23 and the night-off electrical sub-circuit 25. For example, the load management controller may determine that it is desirable to operate the washing machine (not shown) forming part of the night saver-on electrical sub-circuit 23 only during the hours of 11 pm to 8 am and the load management controller will open the switch 37, thereby preventing supply of electricity to sub-circuit 23, between 8 am and 11 pm and close the switch between 11 pm and 8 am to allow supply of electricity and operation of the washing machine. Furthermore, the load management controller can control flow of electricity to certain equipment in the night-off electrical sub-circuit 25 by opening or closing switch 39.

Finally, the load management controller can operate switches 36 and 38 to control flow of electricity to the electrical immersion 29 and the electric under floor/storage heating unit 31, respectively, of the energy storage sub-circuit 19. For example, it may be determined that during times of warm weather it is undesirable to route electricity to the under floor/storage heating unit 31 in which case switch 38 would be opened and surplus electricity will be routed instead through to the electrical immersion 29 to provide hot water. It can be seen that various other circuits could be provided in the energy storage circuit such as an air conditioning system and electricity could be routed to the air conditioning system (not shown) instead of the under floor/storage heating unit and vice versa, depending on the circumstances.

Figure 2:
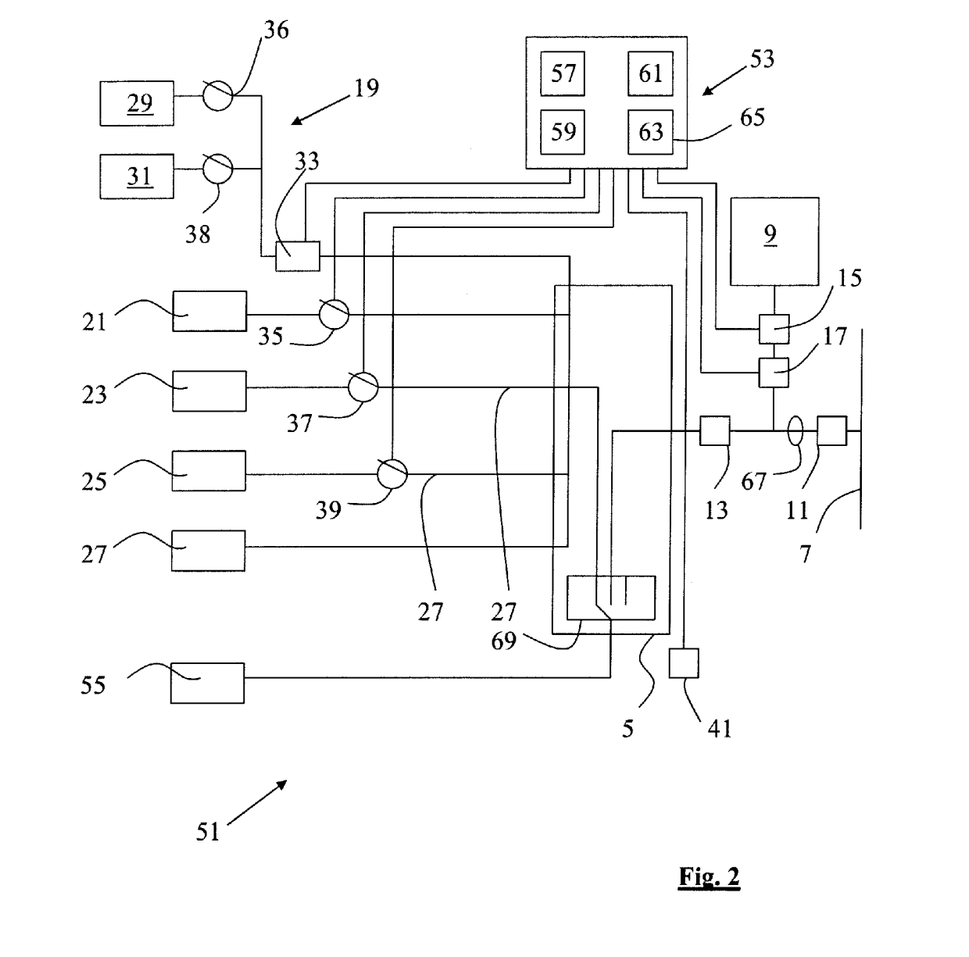
FIG. 2 is a diagrammatic representation of a load management controller in an alternative household electrical installation.

Referring to FIG. 2 of the drawings, there is shown a diagrammatic representation of a load management controller, indicated generally by the reference numeral 53, in an alternative household electrical installation, indicated generally by reference numeral 51, where like parts have been given the same reference numeral as before. The household electrical installation 51 comprises a further electrical sub-circuit 55 comprising a rechargeable static battery bank. In the embodiment shown, the rechargeable static battery bank has been shown in addition to the electrical immersion 29 and the electric under floor/storage heating unit 31 of the energy storage sub-circuit 19 but it will be understood that it could be used instead of one or both of the electrical immersion 29 and the under floor/storage heating unit 31 of the energy storage sub-circuit 19. At least some of the electrical sub-circuits, 19, 21, 23, 25 and 27 have an electricity usage profile (not shown) containing rules determining the supply of electricity to that electrical sub-circuit.

The load management controller 53 comprises means, in this instance processor 57, to access the electricity usage profiles and means 59 to control supply of electricity to the electrical sub-circuits, 19, 21, 23, 25 and 27 having an electricity usage profile in accordance with the rules of the electricity usage profile for that electrical sub-circuit. The load management controller 53 further comprises a programmable accessible memory 61 and a user interface 63. The user interface 63 in turn comprises a data communication port 65. Alternatively, the user interface could comprise a keypad (not shown). The household electrical installation 51 further comprises a plurality of controllable switches 35, 36, 37, 38 and 39 responsive to the means 59 of the load management controller 53. The switches 35, 36, 37, 38 and 39 are each located in an electrical power supply cable 27 intermediate the electricity power supply 5 and the electrical sub-circuit 19, 21, 23, and 25 having an electricity usage profile.

The rechargeable static battery bank 55 is fed from the main panel 5 and the load management controller controls the flow of electricity to the static battery bank 55 in accordance with an electricity usage profile including rules determining the supply of electricity to the static battery bank. The household electrical installation 51 further comprises a switch 67 operable by the load management controller to disconnect the grid supply from the main panel and a switch 69 operable by the load management controller in the main panel routing electricity to and from the static battery bank.

In use, the rechargeable static battery bank 55 is operable as an alternative power supply to the remaining electrical sub-circuits 19, 21, 23, 25 and 27, in the household electrical installation. The switch 69 is provided to connect the rechargeable battery bank to the grid 7 and the micro-generator supply 9, to the remaining sub-circuits 19, 21, 23, 25 and 27 or to isolate the static battery bank. In this way, it is envisaged that the rechargeable static battery bank may be charged up by connecting it to the grid 7 and the micro-generator supply 9 during times where the cost of electricity is relatively low such as at low load times during the middle of the night for example or when excess electricity is being produced by the micro generator 9. Then when the cost of electricity is relatively high such as at peak times during the day, the static battery bank may be used as an alternative power supply to the remaining electrical sub-circuits 19, 21, 23, 25 and 27 in the household electrical installation by switching the switch 69 to connect the electricity power supply to the remaining electrical sub-circuits.

The switch 67 may be used to disconnect the grid 7 supply altogether from the electrical sub-circuits or alternatively the grid 7 may be used to augment the power coming from the static battery bank 55 and the micro generator. Therefore, the power from the static battery bank and the micro-generator 9 is used first of all by the electrical sub-circuits 19, 21, 23, 25 and 27 and when that power is dissipated the power necessary to operate the electrical sub-circuits may be drawn from the grid supply. Appropriate wiring and switching would be required but this wiring and switching arrangement is evident from the foregoing description.

A rectifier/charge controller (not shown) would be provided to convert the electricity supplied to the battery bank 55 from the grid 7 and an inverter (not shown) would be provided to convert the electricity delivered from the battery bank to the electrical sub-circuits. The rectifier/charge controller and inverter have been omitted from the drawing for clarity and it would be understood that these would be provided. The rectifier/charge controller AC/DC device is an AC powered charge controller. As the AC current is simply rectified and delivered to the battery there is no need for an inverter here. The charge rate is determined by the amount of power available at any one time and the battery characteristics. The charge controller adjusts the charge rate accordingly in conjunction with the load management controller. The discharge rate is determined by the state of charge of the battery, the battery characteristics and the demand. The inverter will control this accordingly in conjunction with the load management controller. In this way electricity from a relatively inexpensive source is used to power the electrical sub-circuits. The load management controller will control the rate of charge and discharge of the battery using a suitable charge/discharge controller.

Figure 3:
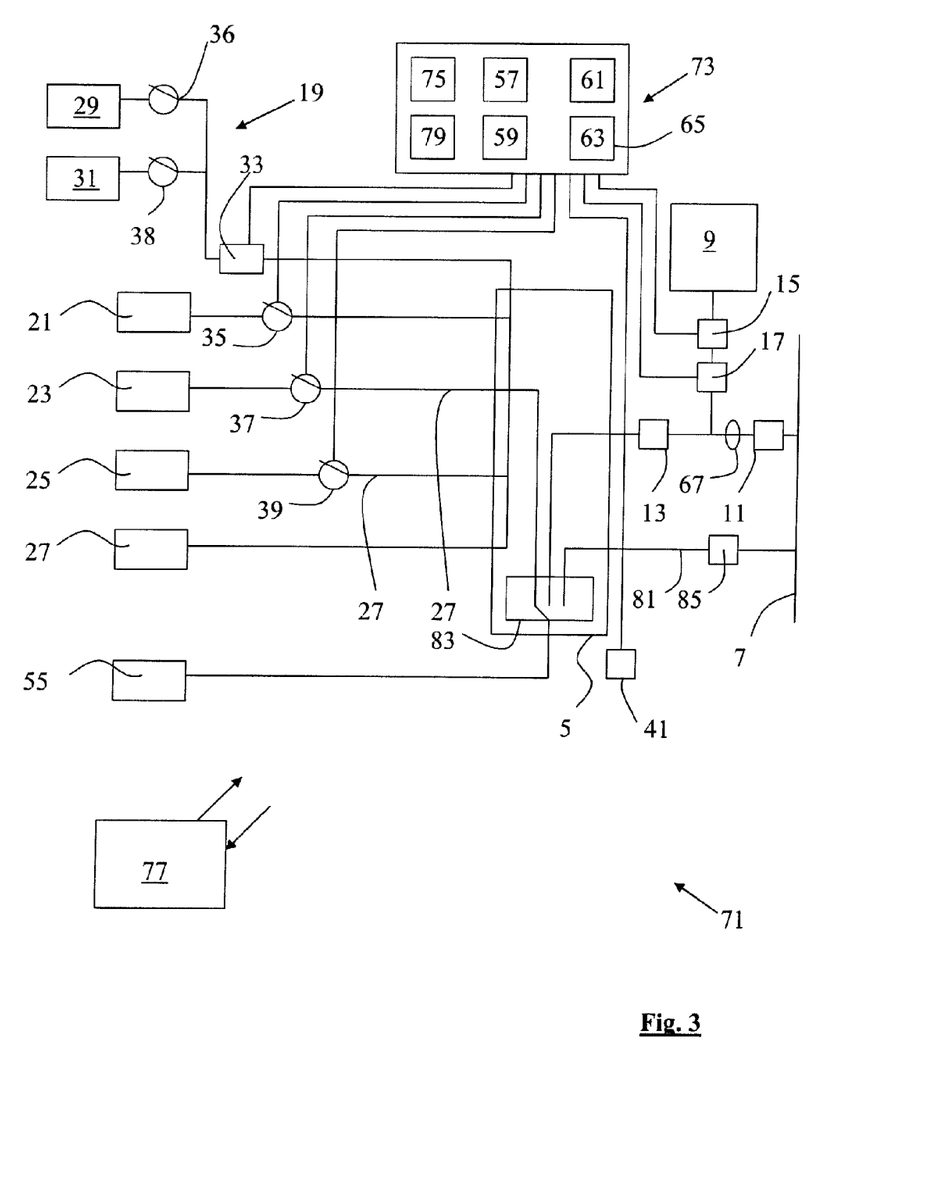
FIG. 3 is a diagrammatic representation of a load management controller in a further alternative household electrical installation.

Referring to FIG. 3 there shown a further still alternative embodiment of load management controller according to the present invention indicated generally by the reference numeral 73, for a household electrical installation 71, where like parts have been given the same reference numeral as before. The load management controller 73 comprises a receiver 75 to receive data from a remote electricity power supply operator 77. The load management controller 73 further comprises a transmitter 79 to transmit data to a remote electricity supply operator 77. The rechargeable static battery bank 55 is connectable to the grid via cable 81 and switch 83. There is further provided a meter 85 intermediate the static battery bank 55 and the grid supply 7.

In use, the load management controller 73 is in communication with the remote electricity power supply operator 77 and receives requests from the remote electricity power supply operator 77 for electricity to be supplied back to the grid 7 from the rechargeable battery bank 55. If the load management controller 73 determines that there is excess electricity in the battery bank 55 that is not required by the sub-circuits 19, 21, 23, 25 and 27, the load management controller can activate switch 83 so that electricity is supplied back to the grid 7 via the cable 81 from the battery bank 55. The load management controller will attempt to reduce the electricity being consumed in the household to enable available excess electricity to be supplied back to the grid.

In this way, at times of excessive load on the grid, the grid operator may pole various load management controllers in households that may have electricity stored in their battery banks to supply that electricity back out onto the grid. The meter 85 is provided on the cable 81 to measure the amount of electricity exported back onto the electricity supply grid. In the communication from the electricity power supply operator 77 to the load management controller 73, the electricity power supply operator 77 may include price information of the amount they are willing to pay for the electricity and the load management controller 73 may make decisions based on the price being offered by the electricity power supply operator for the electricity as to whether or not they wish to supply power back to the grid 7 via the cable 81 from the rechargeable battery bank. In such a scenario, it is envisaged that the load management controller 73 may store electricity in the rechargeable static battery bank 55 at times when the electricity tariff is low and/or when excess electricity is supplied by the micro-generator 9. When the electricity tariff is high and the electricity power supply operator 77 requires electricity to be supplied back to the grid, the load management controller may sell the electricity from the static battery bank 55 back to the grid at a higher price than they originally purchased it for, if indeed they had to purchase it, thereby earning more for the electricity than they paid for it. This will help reduce bills of the household for electricity significantly.

In FIG. 3, a second connection from the household to the grid has been shown though cable 81 and meter 85. These have been shown for illustrative purposes only, it will be understood that in most cases it will be preferable not to have a second connection from the household to the grid. Instead of the arrangement illustrated, the electricity from the battery bank 55 could be routed through the meters 13 and 11 with the existing wiring shown.

It is further envisaged that the load management controller will be able to route electricity generated by the micro-generator 9 back on to the electricity grid 7 directly without having to store the electricity in a battery bank. It will be understood from the foregoing description that this could be achieved using suitable control signals from the load management controller and a suitable switching and wiring arrangement to connect the supply of the micro generator to the grid. The wiring and switching arrangements have been omitted for clarity but it will be understood that the switching and wiring arrangements would be immediately apparent to the skilled addressee from the foregoing once it is known what is to be achieved. Furthermore, suitable metering is provided to monitor the amount of electricity exported onto the grid and suitable rectification circuitry may be provided to deliver the electricity onto the grid in an acceptable format.

Instead of the load management controller 73 communicating directly with the grid operator 77, the load management controller could be in communication with a smart meter if one is installed in place of meter 11. The smart meter may have data such as information relating to tariffs from the grid operator or electricity provider stored thereon or indeed the smart meter could be in communication with the grid operator or electricity provider. If the smart meter is in communication with the grid operator or the electricity provider, the information can be relayed to the load management controller by the smart meter. Similarly, meter 85 could be a smart meter in communication with the load management controller and grid operator.

It will be understood that various modifications could be made to the embodiments described without departing from the spirit of the invention. For example, in the embodiment shown in FIG. 3, the electrical sub-circuit 21 could comprise a resistive heating circuit and instead of a switch, the load management controller operates a thyristor device 35 to vary the amount of electricity being delivered to the resistive heating circuit. The electrical sub-circuit 23 could in turn comprise a switched circuit and the load management controller operates a simple on/off relay 37 intermediate the grid 7 and the electrical sub-circuit 23 to control power to the electrical sub-circuit 23. The electrical sub-circuit 25 could comprise one or more variable speed pumps or fans controlled by the load management controller with the assistance of a speed controller 39.

A dish washer (not shown) and clothes washing machine (not shown) could be provided, each in turn provided with an internal thyristor (not shown) operable by the load management controller 73. A heat pump (not shown) constituting a further electrical sub-circuit could be provided with a distributed load management controller (not shown) that controls the operation of that heat pump. The distributed load management controller would preferably be in communication with the load management controller 73 which acts as a central load management controller for the household electrical installation. Furthermore, the household electrical installation could comprises a plurality of sensors (not shown) which may for example be occupancy, proximity, temperature, vibration or other sensors for reporting to the load management controller 73 to implement the electricity usage profiles of the various electrical sub-circuits. Finally, the load management controller has a processor 57 that implements the electricity usage profiles and memory 61 in which tariff data is stored. Other parts of the load management controller have been omitted for clarity.

Figure 4:
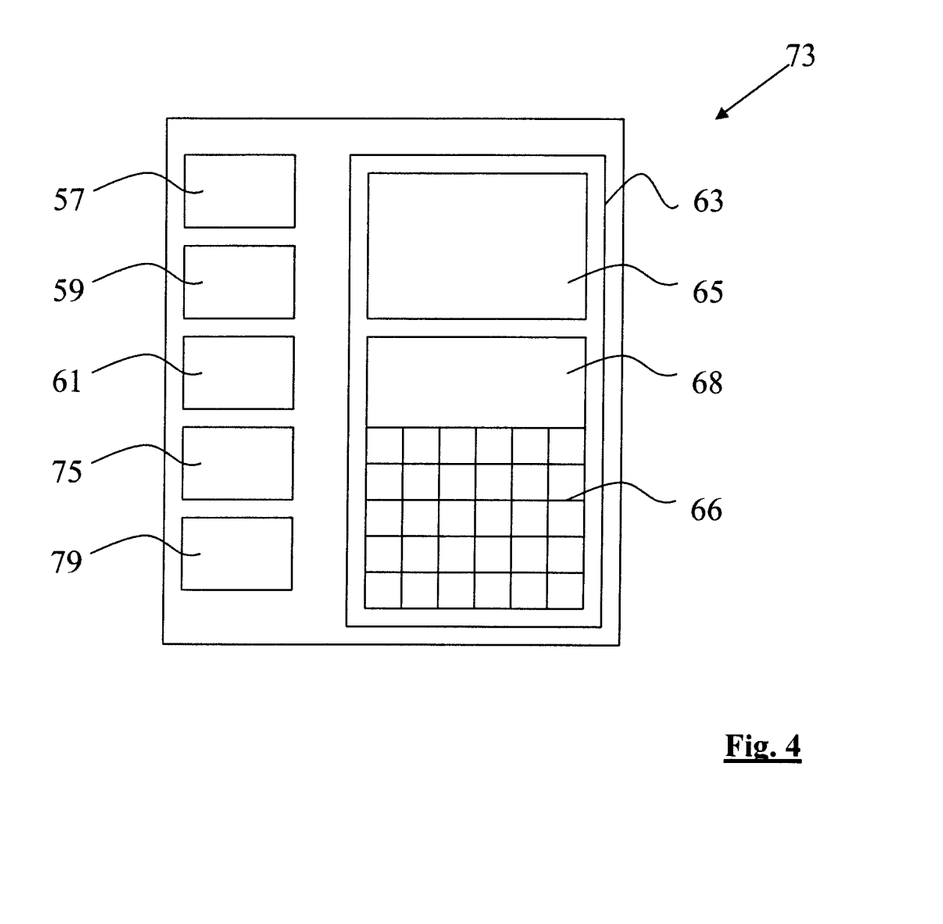
FIG. 4 is a diagrammatic representation of the components of the load management controller.

Referring to FIG. 4, there shown a schematic representation of a load management controller 73 according to the present invention. The load management controller comprises a processor 57 which can access electricity usage profiles of electrical sub-circuits (not shown) stored in memory 61. The load management controller 73 further has means 59 to control the supply of electricity to the electrical sub-circuits (not shown) in accordance with the usage profile of each of the electrical sub-circuits. The means 59 effectively comprises a device capable of communicating with switches (not shown) that control the flow of electricity to the electrical sub-circuits. The means 59 is responsive to the processor 57 and causes operation of the switches to implement the electricity usage profiles.

The load management controller 73 further comprises a user interface 63 to allow programming of the electricity usage profiles in accessible memory 61. The user interface comprises a data communication port 65 and a keypad 66 with a screen 68. The household electrical installation (not shown) may be broken down into a number of separate sub-circuits and each of those sub-circuits may be given an electricity usage profile, which is stored in the memory 61. The keypad 66 or data communication port 65 may be used by an operator or other authorised individual or entity to communicate with the load management controller 73 and store, update, alter or delete electricity usage profiles stored in memory 61 of the electrical sub-circuits or add new profiles for new electricity sub-circuits. Furthermore, the keypad 66 and the data communication port 65 may be used to designate certain equipment to sub-circuits.

The load management controller further comprises a receiver 75 for receiving communications from a remote electricity supply operator (not shown) and a transmitter 79 for transmitting data to a remote electricity power supply operator. Alternatively, a transceiver could be provided in place of the separate receiver 75 and transmitter 79. It is important that in certain embodiments the load management controller 73 has means to communicate with an electricity power supply operator. In this way, the load management controller can determine prices being offered for electricity stored in a static battery bank (not shown) of the household electrical installation or being generated by the micro-generator and whether it is advantageous for the load management controller to export that stored or generated electricity back to the grid at that time. Furthermore, it may allow the load management controller to determine whether it is worthwhile to charge the batteries in the rechargeable static battery bank at that particular moment in time due to the low cost of electricity from the grid or the greater benefit of storing the energy supplied by the micro-generator rather than exporting it. These communications could be made directly from the load management controller or via the smart meter.

The data communication port 65 could comprise a simple cable port for reception of a complimentary cable or indeed could comprise a connection to a cable or other device for communication with a communication device operated by the operator of the load management controller or could be a wireless data communication port for receiving communications to and from a computing device. It will be understood the various different implementations of data communication port could be embodied or envisaged and what is important is that it is possible for an operator of the load management controller to communicate with the load management controller. In certain instances, direct communications between the load management controller and the grid operator or electricity supplier may not be possible. In this case, the load management controller will have means for receiving information relating to time based tariffs and other factors that need to be taken into account when constructing optimised usage profiles. This may be done using chipped cards, on-line communications, wireless communications, manually entered data and the like.

In the embodiments described, the electricity usage profiles have been stored in memory 61 and are accessible by the processor 57 of the load management controller. It is envisaged that the electricity usage profiles may be stored remotely in a dedicated memory or may be stored in the electrical sub-circuits themselves. What is important is that the load management controller can access the electricity usage profiles and implement the profiles.

Certain components of the system are seen as important for the successful implementation of the invention. First of all, the load management controller comprises means to receive, store and process information about tariffs that apply to electricity imported into the household from the grid and electricity exported from the household to the grid. This information may be provided in the form of a schedule of time or load related charges, or any other related charges. The information may be placed in the memory of the load management controller prior to or when it is being installed and may be updated from time to time thereafter. This information may be input into the load management controller using a number of different means including a keyboard, a touch screen, a chipped card, a removable memory device and various wired or wireless communication links. This information may be provided in real-time at the time when the tariff applies or a related command is issued by means of an appropriate communications link with the supplier and/or purchaser of the electricity and/or the grid operator.

Secondly, the system further comprises means of instantaneously measuring the amount of electricity being imported into the household from the grid or being exported from the household to the grid. Where the meters installed by the grid operator are capable of making these measurements and making them available for use by the load management controller and the grid operator allows the owners of the load management controllers to make use of these measurements, they will be obtained directly from the meter by means of a suitable communications system. Where this is not possible the load management controller may alternatively use direction detecting current transformers or similar devices fitted to the cables linking the household electrical installation to the grid to make these measurements.

The load management controller can make use of additional sensors where they are available. For example, a proximity sensor for detecting if the occupants of the household are nearby, an occupancy sensor for detecting if the household is occupied, an occupancy sensor for detecting what parts of the household are occupied and a sensor for detecting if the occupants of the household are awake or asleep. This sensor could be implemented in a number of different ways. For example, in its simplest form, this sensor could be a manually operated on/off switch beside an occupants bed. Alternatively, the sensor could be a manually operated off switch and an automatic on switch that is triggered whenever any of the lighting circuits are switched on or the internal alarm sensors activated. In a further alternative embodiment, the sensor could comprise two sensors—one monitoring the PV output (this drops to zero at night) and another monitoring the lighting circuits. The system can be set to assume the occupants are either out or asleep when the PV output is zero and all the lights are off. The sensors may consist of GPS type hand-held devices, intruder alarm type devices, car key fobs, card access control devices, passive infra-red sensors, movement detectors, vibration detectors, current transformers (on lighting circuits for example), alarm clocks, programmable timers and so on. Signals from these sensors will be communicated to the load management controller by means of suitable hard-wired and/or wireless links.

Another important aspect of the present invention is that there is a means of controlling the amount of electricity supplied to the various electrical sub-circuits including individual items of electrical equipment and elements within the individual items of equipment that are to be controlled. These will consist of on-off switching devices such as electro-mechanical, solid-state relays and the like and high-speed switching devices such as zero crossing, single cycle, burst-firing, phase angle firing and delay triggering thyristors. It is envisaged that other switching devices could be used if desired. The switches and thyristors could be located beside or in individual socket outlets and wall switches that control individual sockets and items of electrical equipment or within individual items of electrical equipment that control individual items of equipment or elements within the individual items of equipment.

It is envisaged that communications channels between the load management controller and distributed switches and thyristors could be implemented a number of different ways including individual hard-wired communications links, a hard-wired communications network, communication signals carried on mains electrical cables or communication signals carried using wireless technologies.

A further important aspect of the present invention is a means of controlling the speed of fans, pumps and heat pumps that can be usefully operated at less than full speed. These speed controllers will be used to adjust the amount of electricity supplied to these components. The speed controllers may be provided by way of dimmer/thyristor like devices that can be used to control the speed of electric motors very efficiently. They may be fitted to more and more pump, fans, chillers and the like to enable them to be slowed down during periods of low demand (low heat load, low ventilation load, low chilling load).

Another aspect of the present invention is the Charge/Discharge Control Devices and Inverters where rechargeable battery banks and/or electric vehicles with rechargeable battery supplies are connected to or from part of the household electrical installation. The load management controller has means of detecting the presence of rechargeable static battery banks and/or electric vehicles with rechargeable battery supplies that are part of the household electrical installation and where these exist the load management controller has means of measuring the state of charge of these battery banks or supplies and controlling the rate of charge or discharge of these battery banks and supplies. These will consist of suitably sized or designed charge/discharge controllers and inverters that can be used to charge rechargeable static battery banks and rechargeable battery supplies of electric vehicles using electricity drawn from the household electrical installation as and when signalled to do so and can at other times be used to draw electricity from the static battery bank and/or battery supplies and transfer it to the other household electrical installation sub-circuits by means of a suitably designed inverter. The charge/discharge control devices preferably include a charge indicator that provides the load management controller with data indicating the capacity of the static battery bank or battery supply of the electric vehicle for storing or providing power at all times.

The load management controller has a processor to use one or more of the tariff data, load data and sensor data to operate the devices controlling electricity supplied to and drawn from the various electrical sub-circuits and individual items of electrical equipment and elements within the individual items of equipment in a way that minimises the use and cost of imported electricity and maximises the value of exported electricity. This will be implemented by a suitably programmed central processor unit that receives and processes the data and sends appropriate commands to the various switching devices, charge/discharge controllers, inverters and speed controllers.

According to one aspect of the present invention, it is envisaged that thermal energy using and storing devices such as hot water heaters, towel rails, floor heaters, storage heaters, fridges, freezers (storage coolers) and the like will be used as adjustable electric loads that can be continually gradually reduced and increased to keep overall household load constantly at optimum level. Furthermore, the electrical sub-circuits may be a simple device, a group of devices or one or more components of one or more devices The present invention is in no way related to timer clocks or other devices used to pre-program the start and stop time of a central heating system or a security lighting arrangement. Furthermore, the present invention is in no way concerned with systems such as those found in hotels in which the electrical sockets or lights are only activated on the insertion of a hotel key card or like device being inserted into a complimentary holder. The invention is directed towards a far more comprehensive solution to management of the electricity usage in an entire household. The present invention is not intended to cover uninterrupted power supplies (UPS) such as diesel powered UPS and the like and it is intended that the present invention will be limited to micro-generators as hereinbefore described.

In this specification, the term household has been used throughout to indicate a relatively small scale structure that would potentially implement some form of renewable energy power supply. It will be understood that household is not intended to be solely limited to houses but may include other permanent or temporary structures, particularly those used as dwellings, including but not limited to apartments, flats, sports facilities including both indoor and outdoor arenas, office buildings, buildings in which businesses operate, public services buildings, hospitals, hotels, hostels, guest houses, places of worship, marquees and the like. Furthermore, the term grid has been used to indicate not simply the national electricity supply grid but a regular power supply which may include a non-environmentally friendly power supply such as a dedicated diesel burning power supply that may be in use in such structures. In such cases, the present invention operates by substituting the non-environmentally friendly power supply with the more environmentally friendly renewable energy power supply from the micro-generator.

It can be seen from the foregoing that the present invention provides the users with a highly efficient low cost means of storing surplus electricity in the form of heat, either in insulated hot water cylinders or electric storage heaters (which may be fixed to walls or laid in or on walls, floors or ceilings). In addition to the above, the present invention allows for users to switch on certain non-essential circuits (such as those serving washing machines and the like) during periods of high output from the micro-generator. The objective of the load management controller is to provide a means by which the amount of electricity being consumed in a household can be adjusted seamlessly and efficiently and without causing disruption in the supply or disturbance to the occupants of the household. This device can be used to adjust the amount of electricity being consumed in the household to match, as closely as possible, the output from a local micro-generator and to thereby prevent output from the micro-generator being exported to the grid unnecessarily.

Furthermore, the smart meter is provided with communication means that enables it to receive information from the grid operator that indicates when the amount of electricity being drawn from or exported to the grid should be reduced or increased to assist with the management of the grid and grid connected generators. The smart meter can also receive information about the cost of electricity being drawn from the grid and the value of electricity being exported to the grid. This information enables the smart meter to send a signal to the load management controller indicating if the amount of electricity being drawn from or exported to the grid should be increased or decreased. The load management controller can use this information together with the information about the amount of electricity being generated by the micro-generator and being consumed in the household it is collecting directly to adjust the amount of electricity being consumed in the household accordingly. Instead of substituting the electric meter with a new smart meter, the smart meter or other similar device could be used in conjunction with the existing electric meter, augmenting the standard electric meter.

The present invention has the ability to utilize the load management controller in conjunction with a smart meter in an attempt to overcome some of the above-mentioned problems. The controller monitors local consumption and output from local generators as well as effectively monitoring the load on the local grid by means of a smart meter. The controller then manages local non-essential electrical loads accordingly. The first function the controller performs is the switching of occupancy/activity related circuits. These circuits are switched off when the house or room is empty or the occupants are asleep and on at all other times. The second function the controller performs is to switch time related circuits on and off. These circuits typically comprise washing and drying machines and the like. This will mainly apply to day and night conditions but it is envisaged that this will in due course relate solely or in conjunction with grid/central plant conditions. The third function is to take account of the following nine typical conditions of the grid/central plant and the building being supplied by the grid as well as a micro-generator:

| Grid/Central Plant | Overloaded | Under loaded | In balance |
|---|---|---|---|
| Building | 1. Importing | 2. Exporting | 3. In balance |
| Building | 4. Exporting | 5. In balance | 6. Importing |
| Building | 7. In balance | 8. Importing | 9. Exporting |

During conditions 1, 4, 6 and 7 the controller will attempt to ramp down the local controllable load. It can be seen from the table that in conditions 1, 4 and 7 the grid/central plant is overloaded and the building is importing, exporting and in balance respectively. In condition 6, the grid/central plant is in balance and the building is importing.

During conditions 2, 5, 8 and 9 the controller will attempt to ramp up local controllable loads that have the capacity to store energy. In conditions 2, 5 and 8 the grid/central plant is under-loaded and the building is exporting, in balance and importing respectively. In condition 9 the grid/central plant is in balance and the building is exporting. Finally, during condition 3, when the grid/central controller and the building are both in balance, the controller does nothing.

It is envisaged that the load management controller can operate in both a central and distributed format. In the central format the controller ramps the power supplied to a single circuit serving a number of electric components up and down as necessary. In the distributed format, the controller controls individual components (e.g. speed controlled pumps and fans) or parts of individual components (heating elements, compressors, CPUs). In the distributed format where parts of individual components may be controlled, it will be necessary to check with equipment manufacturers about the suitability of their equipment for this type of control. It may also be possible to arrange for the equipment manufacturers to supply components with the ability to receive and respond to commands from the central load management controller.

It is envisaged that in some instances only a portion of the electricity in the electricity banks may be exported back out onto the grid to ensure that the household does not export all of the inexpensive electricity that it had stored in its battery banks and then have to import more electricity from the grid at a more expensive rate. It is further envisaged that controls could be provided to allow the inhabitant to pre-program the device so that predetermined amounts of electricity are kept in the battery banks or that they may be allowed discharge fully, e.g. if the inhabitant is going to be out of the property during the entire time that the electricity is at the more expensive rate, it may be advantageous to offer all of the electricity in the battery banks to the electricity producer supplying electricity over the grid. Similarly, it may be advantageous to offer all of the electricity supplied by the micro-generator to the grid in certain cases, for example when the occupants are likely to be away from the household for an extended period, on holidays, or when the battery banks are already fully charged.

In the specification the terms "comprise, comprises, comprised and comprising" and the terms "include, includes, included and including" are deemed totally interchangeable and should be afforded the widest possible interpretation. The invention is in no way limited to the embodiments hereinbefore described which may be varied in both construction and detail within the scope of the claims.

The invention claimed is:

1. A load management controller for a household electrical installation, the household electrical installation comprising a main panel receiving electricity from a pair of electricity supplies and distributing the electricity to a plurality of electrical sub-circuits, one of which being an energy storage sub-circuit, the pair of electricity supplies comprising a grid supply and a micro-generator supply, the household electrical installation further comprising:
   i. a power meter to monitor the amount of electricity being supplied by the micro-generator;
   ii. a power meter to monitor the amount of electricity being consumed in the household; and
   iii. the load management controller comprising means to determine a surplus electricity amount by determining the amount of electricity generated by the micro-generator which is not being consumed in the household; and altering the amount of electricity supplied to the energy storage sub-circuit to route the surplus electricity to the energy storage sub-circuit; the means to alter the amount of electricity supplied to the energy storage sub-circuit further comprising a high-speed switching device which gradually and continuously adjusts in real time the amount of electricity supplied to the energy storage sub-circuit to set the amount of electricity being supplied to the energy storage sub-circuit to any value between 0% and 100% of the total load of the energy storage sub-circuit so as to continuously match, as closely as possible, the amount of electricity supplied to the energy storage sub-circuit with the surplus electricity, so as to prevent output from the micro-generator supply being exported to the grid.

2. A load management controller as claimed in claim 1 in which the energy storage sub-circuit comprises an energy storage device.

3. A load management controller as claimed in claim 1 in which the energy storage sub-circuit comprises an energy storage device.

4. A load management controller as claimed in claim 1 in which each of the electrical sub-circuits has an electricity usage profile containing rules determining the supply of electricity to the electricity sub-circuit associated therewith, the load management controller comprising means to access the electricity usage profiles and means to control supply of electricity to the electrical sub-circuits having an electricity usage profile in accordance with the rules of the electricity usage profile for that electrical sub-circuit.

5. A load management controller as claimed in claim 4 in which the means to control supply of electricity to the electrical sub-circuits further comprises a thyristor, responsive to the load management controller, intermediate the electricity power supply and the electrical sub-circuit having an electricity usage profile.

6. A load management controller as claimed in claim 4 in which the means to control supply of electricity to the electrical sub-circuits further comprises a speed controller, responsive to the load management controller, intermediate the electricity power supply and the electrical sub-circuit having an electricity usage profile.

7. A load management controller as claimed in claim 1 in which the load management controller has means to export electricity from a rechargeable battery bank onto an electricity supply grid.

8. A load management controller as claimed in claim 7 in which the load management controller exports the electricity to the electricity supply grid in response to a request for electricity received from a remote electricity power supply operator.

9. A load management controller for a household electrical installation as claimed in claim 1 in which one of the electricity sub-circuits comprises a rechargeable battery bank in an electric vehicle operable as an alternative power supply to the remaining electrical sub-circuits in the household electrical installation.

10. A load management controller as claimed in claim 1 in which the micro-generator supply further comprises a dedicated inverter/controller circuit.

11. A household electrical installation comprising a main panel receiving electricity from a pair of electricity supplies and distributing the electricity to a plurality of electrical sub-circuits, one of which being an energy storage sub-circuit, the pair of electricity supplies comprising a grid supply and a micro-generator supply, the household electrical installation further comprising a load management controller, the household electrical installation comprising:
   i. a power meter to monitor the amount of electricity being supplied by the micro-generator;
   ii. a power meter to monitor the amount of electricity being consumed in the household; and
   iii. the load management controller comprising means to determine a surplus electricity amount by determining the amount of electricity generated by the micro-generator which is not being consumed in the household; and alter the amount of electricity supplied to the energy storage sub-circuit to route the surplus electricity to the energy storage sub-circuit; and in which one of the electricity sub-circuits comprises a rechargeable battery bank in an electric vehicle operable as an alternative power supply to the remaining electrical sub-circuits in the household electrical installation; characterised in that, the means to alter the amount of electricity supplied to the energy storage sub-circuit further comprises a high-speed switching device which gradually and continuously adjusts in real time the amount of electricity supplied to the energy storage sub-circuit to set the amount of electricity being supplied to the energy storage sub-circuit to any value between 0% and 100% of the total load of the energy storage sub-circuit so as to continuously match, as closely as possible, the amount of electricity supplied to the energy storage sub-circuit with the surplus electricity, so as to prevent output from the micro-generator supply being exported to the grid.

12. A household electrical installation as claimed in claim 11 in which each of the electrical sub-circuits has an electricity usage profile containing rules determining the supply of electricity to the electrical sub-circuit associated therewith, the load management controller having access to each of the electricity usage profiles, the load management controller having means to control the supply of electricity to the electricity sub-circuits in accordance with the rules of the electricity usage profile of the electrical sub-circuits.

13. A household electrical installation as claimed in claim 11 in which one of the electricity sub-circuits comprises a rechargeable static battery bank operable as an alternative power supply to the remaining electrical sub-circuits in the household electrical installation.

14. A household electrical installation comprising a main panel receiving electricity from a pair of electricity supplies and distributing the electricity to a plurality of electrical sub-circuits, one of which being an energy storage sub-circuit, the pair of electricity supplies comprising a grid supply and a micro-generator supply, the household electrical installation further comprising a load management controller, the household electrical installation comprising:

i. a power meter to monitor the amount of electricity being supplied by the micro-generator;

ii. a power meter to monitor the amount of electricity being consumed in the household; and iii. the load management controller comprising means to determine a surplus electricity amount by determining the amount of electricity generated by the micro-generator which is not being consumed in the household; and altering the amount of electricity supplied to the energy storage sub-circuit to route the surplus electricity to the energy storage sub-circuit; and in which the load management controller comprises means to select one of a rechargeable static battery bank, a rechargeable battery bank in an electric vehicle, a micro-generator supply and a grid power supply to provide power to one or more of the remaining electrical sub-circuits; characterised in that, the means to alter the amount of electricity supplied to the energy storage sub-circuit further comprises a high-speed switching device which gradually and continuously adjusts in real time the amount of electricity supplied to the energy storage sub-circuit to set the amount of electricity being supplied to the energy storage sub-circuit to any value between 0% and 100% of the total load of the energy storage sub-circuit so as to continuously match, as closely as possible, the amount of electricity supplied to the energy storage sub-circuit with the surplus electricity, so as to prevent output from the micro-generator supply being exported to the grid.

15. A household electrical installation as claimed in claim 14 in which each of the electrical sub-circuits has an electricity usage profile containing rules determining the supply of electricity to the electrical sub-circuit associated therewith, the load management controller having access to each of the electricity usage profiles, the load management controller having means to control the supply of electricity to the electricity sub-circuits in accordance with the rules of the electricity usage profile of the electrical sub-circuits.

* * * * *